United States Patent
Horiguchi

(10) Patent No.: US 12,162,403 B2
(45) Date of Patent: Dec. 10, 2024

(54) DRIVE ASSIST APPARATUS FOR VEHICLE

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 75 days.

(21) Appl. No.: 18/125,939

(22) Filed: Mar. 24, 2023

(65) Prior Publication Data

US 2023/0311747 A1    Oct. 5, 2023

(30) Foreign Application Priority Data

Apr. 5, 2022    (JP) .................................. 2022-062845

(51) Int. Cl.
*B60Q 1/34*    (2006.01)
*B60Q 1/50*    (2006.01)

(52) U.S. Cl.
CPC ............ *B60Q 1/346* (2013.01); *B60Q 1/507* (2022.05); *B60Q 2800/10* (2022.05)

(58) Field of Classification Search
CPC ........ B60W 2540/20; B60W 30/18154; B60Q 1/346; B60Q 1/38; B60Q 1/507; B60Q 2800/10

See application file for complete search history.

(56) References Cited

U.S. PATENT DOCUMENTS

| 2015/0266413 A1* | 9/2015 | Raubvogel ............... B60Q 1/40 701/408 |
| 2020/0269748 A1* | 8/2020 | Mimura .................. B60Q 1/245 |
| 2020/0307579 A1 | 10/2020 | Mizoguchi |
| 2022/0153267 A1* | 5/2022 | Ito ......................... B60W 40/02 |

FOREIGN PATENT DOCUMENTS

JP    2020-166393 A    10/2020

* cited by examiner

*Primary Examiner* — Omer S Khan
(74) *Attorney, Agent, or Firm* — TROUTMAN PEPPER HAMILTON SANDERS LLP

(57) ABSTRACT

A drive assist apparatus for a vehicle includes a turn signal drive unit, an environment information obtainer, and a controller. The controller includes a blinking cycle adjuster configured to cause the turn signal drive unit to drive with drive signals indicating blinking cycles different from each other. The blinking cycles include a first blinking cycle and a second blinking cycle shorter than the first blinking cycle. The blinking cycle adjuster is configured to set the first blinking cycle for the vehicle that travels at a first position, and set the second blinking cycle for the vehicle that travels at a second position closer to the intersection than the first position.

2 Claims, 12 Drawing Sheets

DRIVE ASSIST APPARATUS FOR VEHICLE

CROSS-REFERENCE TO RELATED APPLICATION

The present application claims priority from Japanese Patent Application No. 2022-062845 filed on Apr. 5, 2022, the entire contents of which are hereby incorporated by reference.

BACKGROUND

The disclosure relates to a drive assist apparatus for a vehicle, configured to set the blinking cycle of turn signal lamps when the vehicle intends to turn at an intersection by autonomous driving to be shorter as the vehicle approaches the intersection at which the vehicle intends to turn.

As a drive assist apparatus of this type, there has been available an apparatus configured to set, when a driver (operator) who drives the vehicle sets a destination, a driving route from the current location to the destination, and, on behalf of the driver partially or entirely, causes the vehicle to drive autonomously. In autonomous driving on general roads, the driving environment around the vehicle is recognized by sensing devices such as cameras, and the presence or absence of the preceding vehicle and the following vehicle is monitored at all times.

Then, if the driving route is set in the direction of a cross street on the right turn or left turn side, the turn signal lamps on the right turn or left turn side are blinked before the cross street, thereby indicating the intent to change course to other vehicles intending to enter the lane where the vehicle is driving from the cross street and to the following vehicle. Therefore, it is necessary for the surrounding vehicles and pedestrians to recognize in advance the direction in which the vehicle is progressing by blinking the turn signal lamps.

This is also the case when changing lanes by autonomous driving. For example, Japanese Unexamined Patent Application Publication (JP-A) No. 2020-166393 discloses a technique for blinking the turn signal lamps on the lane change side in advance when the vehicle changes lanes, thereby signaling to the following vehicle and the surrounding vehicles that the vehicle is changing lanes.

SUMMARY

An aspect of the disclosure provides a drive assist apparatus for a vehicle. The drive assist apparatus includes: a turn signal drive unit configured to blink turn signal lamps provided on the vehicle at certain cycles; an environment information obtainer configured to obtain surrounding environment information on the vehicle; and a controller configured to, when a target traveling route of the vehicle is set to a route at least from a current traveling street in which the vehicle travels into a first cross street that intersects the current traveling street at an intersection ahead of the vehicle, drive the turn signal drive unit from a pre-set blinking start distance before the intersection. The controller comprises a blinking cycle adjuster configured to cause the turn signal drive unit to drive with drive signals indicating blinking cycles different from each other, the blinking cycles include a first blinking cycle and a second blinking cycle shorter than the first blinking cycle. The blinking cycle adjuster is configured to set the first blinking cycle for the vehicle that travels at a first position, and set the second blinking cycle for the vehicle that travels at a second position closer to the intersection than the first position.

An aspect of the disclosure provides a drive assist apparatus for a vehicle. The drive assist apparatus includes circuitry. The circuitry is configured to: cause a turn signal drive unit to blink turn signal lamps provided on the vehicle at certain cycles; receive surrounding environment information on the vehicle; and when a target traveling route of the vehicle is set to a route at least from a current traveling street in which the vehicle travels into a first cross street that intersects the current traveling street at an intersection ahead of the vehicle, drive the turn signal drive unit from a pre-set blinking start distance before the intersection. The circuitry is configured to cause the turn signal drive unit to drive with drive signals indicating blinking cycles different from each other. The blinking cycles include a first blinking cycle and a second blinking cycle shorter than the first blinking cycle. The circuitry is configured to set the first blinking cycle for the vehicle that travels at a first position, and set the second blinking cycle for the vehicle that travels at a second position closer to the intersection than the first position.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The timing to start blinking the turn signal lamps when the vehicle changes lanes, and the timing to start blinking the turn signal lamps when the vehicle intends to turn right or left at an intersection are all defined by law. Therefore, even in autonomous driving, when the vehicle intends to turn right or left, it is necessary to start blinking the turn signal lamps, according to the provisions of the law, from a pre-defined position (such as 30 [m]) before an intersection at which the vehicle intends to turn right or left.

However, a problem arises when, for example, the vehicle intends to turn left by autonomous driving on a left-hand traffic road and there is another intersection before the intersection at which the vehicle intends to turn left. That is, if another vehicle is about to enter the driving lane of the vehicle from a cross street of this other intersection, there is a possibility that a driver who drives this other vehicle misunderstands that the approaching vehicle (vehicle) intends to enter the cross street from this other intersection.

If the driver of this other vehicle has misunderstood as described above, there is a possibility that this other vehicle enters the lane before the approaching vehicle (vehicle) passes through this other intersection. As a result, the vehicle will apply emergency braking in order to avoid interference with this other vehicle, which will cause both drivers to panic.

It is desirable to provide a drive assist apparatus for a vehicle, which is capable of clearly indicating, to drivers who drive other vehicles, at which intersection the vehicle intends to turn, so that the drivers of the other vehicles will not be misled about the intersection at which the vehicle intends to turn.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Note that the present embodiment will be described assuming for convenience that driving lanes are left-hand traffic roads. Therefore, in the case where driving lanes are right-hand traffic roads, the present embodiment is applied by reversing left and right.

Figure 1:
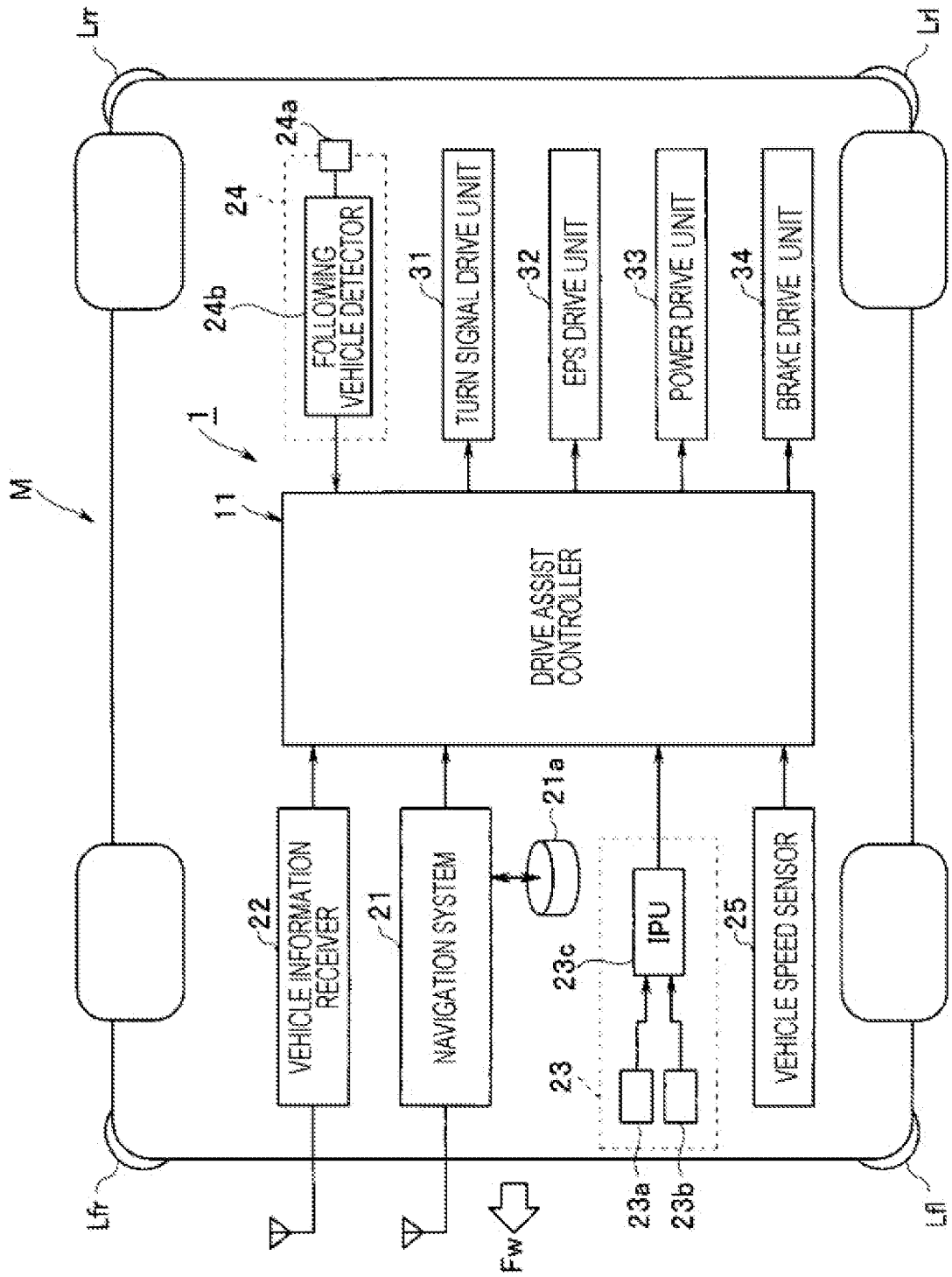
FIG. 1 is a schematic configuration diagram of a drive assist apparatus.

In FIG. 1, a drive assist apparatus 1 mounted on a vehicle M includes a drive assist controller 11, which executes drive assist necessary for driving, such as vehicle speed control and steering control during autonomous driving. The drive assist controller 11 is constituted of a micro-controller including a central processing unit (CPU), a random-access memory (RAM), a read-only memory (ROM), a rewritable non-volatile memory (flash memory or electrically erasable programmable read-only memory (EEPROM)), and peripheral equipment. The ROM stores programs, fixed data, and the like necessary for the CPU to execute each process. In addition, the RAM is provided as a work area for the CPU, where various types of data used in the CPU are temporarily stored. Note that the CPU is also called a microprocessor (MPU) or a processor. Meanwhile, a graphics processing unit (GPU) or a graph streaming processor (GSP) may be used in place of the CPU. Alternatively, the CPU, GPU, and GSP may be selectively combined and used.

As means of obtaining parameters necessary for autonomous driving, a navigation system 21, a vehicle information receiver 22, a camera unit 23, a rear detection unit 24, a vehicle speed sensor 25 configured to detect the vehicle speed of the vehicle M, and the like are coupled to the input side of the drive assist controller 11. Note that, in one embodiment, the camera unit 23 and the rear detection unit 24 may serve as an "environment information obtainer" configured to obtain surrounding environment information.

Here, the navigation system 21 includes a positioning radio wave receiver. The navigation system 21 obtains position information (coordinates such as latitude and longitude) based on position signals from positioning satellites such as Global Navigation Satellite System (GNSS) received by the positioning radio wave receiver, displays a driving route to a destination set by a driver who drives the vehicle M on high-precision road map information (dynamic map) stored in a high-precision road map database 21a, and overlaps the current position of the vehicle M on the coordinates of the obtained vehicle position.

The road map information includes static map information and dynamic map information, which are necessary for the autonomous driving of the vehicle M. The static map information includes the shape of roads and structures, lane information, and the like. In addition, the dynamic map information includes information that changes from moment to moment, such as traffic restrictions, accidents, traffic congestion, vehicles, pedestrians, and the like on each road, and is continuously updated and superimposed on the static information.

Moreover, the vehicle information receiver 22 receives surrounding vehicle information of the vehicle M via a reception antenna using vehicle-to-vehicle communication, road-to-vehicle communication, and the like.

The camera unit 23 includes a stereo camera consisting of a main camera 23a and a sub camera 23b, each of which is provided with an image sensor such as a charge-coupled device (CCD) or complementary metal-oxide-semiconductor (CMOS), and an image processing unit (IPU) 23C, which applies certain image processing to preceding driving environment information of the vehicle M captured by the two cameras 23a and 23b and sends it to the drive assist controller 11.

The rear detection unit 24 includes a rear detection sensor 24a and a following vehicle detector 24b. The rear detection sensor 24a senses a certain sensing region at the rear and obtains rear environment information. The rear detection sensor 24a is constituted of one or more of a moving image camera, an ultrasonic sensor, a millimeter-wave radar, a microwave radar, a light detection and ranging (LIDAR), and the like. Note that the moving image camera is not limited to a stereo camera, and may be a monocular camera. In addition, the following vehicle detector 24b examines the presence or absence of a following vehicle S that follows the vehicle M and the vehicle-to-vehicle distance between the vehicle M and the following vehicle S based on the rear environment information obtained by the rear detection sensor 24a.

In contrast, a turn signal drive unit 31, an electric power steering (EPS) drive unit 32, a power drive unit 33, and a brake drive unit 34 are coupled to the output side of the drive assist controller 11. The turn signal drive unit 31 blinks front left and right turn signal lamps Lfl and Lfr and rear left and right turn signal lamps Lrl and Lrr. Hereinafter, the turn signal lamps Lfl, Lfr, Lrl, and Lrr may be collectively denoted as "Lw".

The EPS drive unit 32 drives an EPS. The power drive unit 33 drives a drive source (engine, electric motor, etc.). Moreover, the brake drive unit 34 adjusts a brake fluid pressure supplied to a brake unit to generate a braking force.

Figure 10:
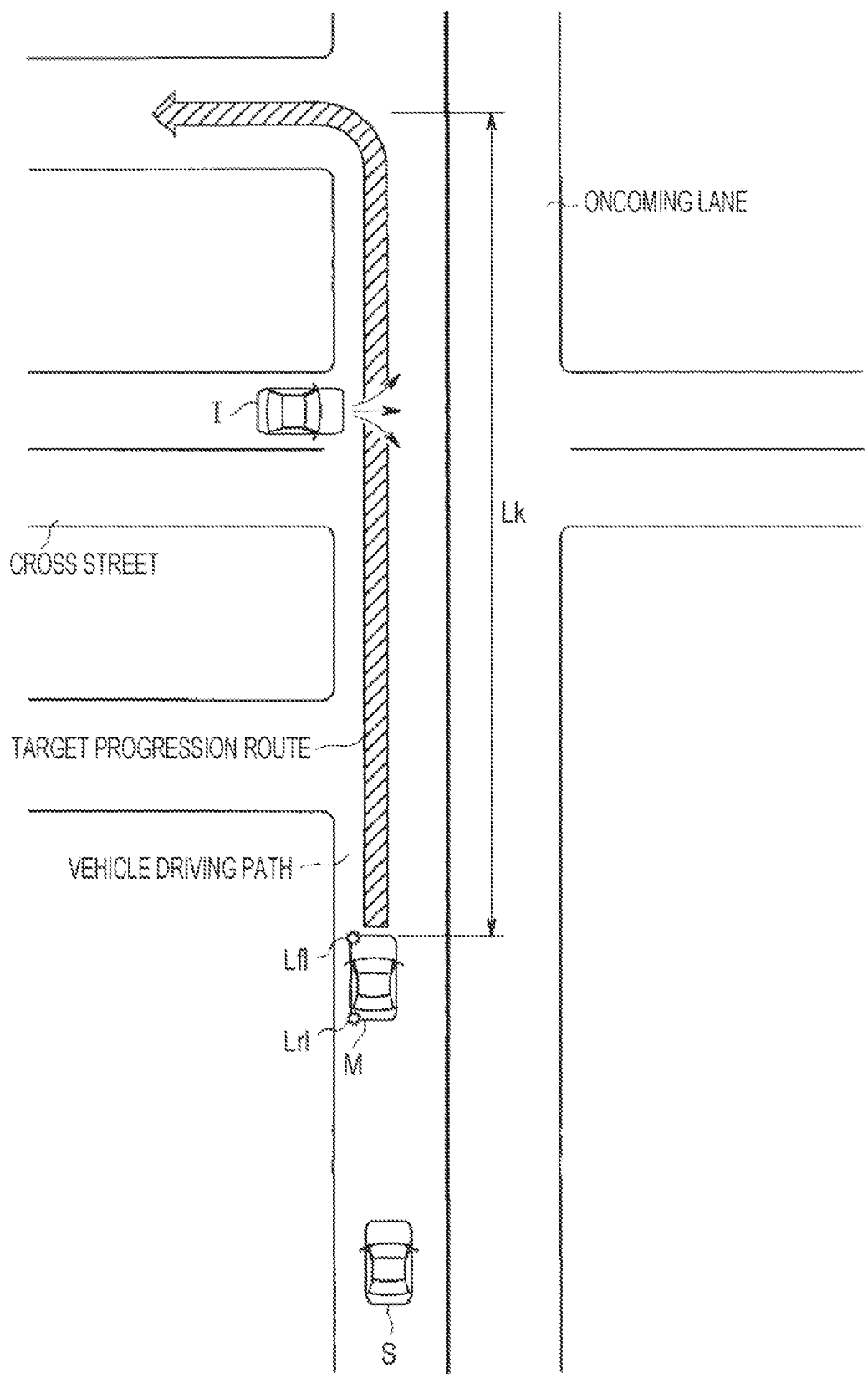
FIG. 10 is a bird's eye view illustrating the blinking state of turn signal lamps when the vehicle intends to turn left by autonomous driving.

When a driver who drives the vehicle M inputs a destination to the navigation system 21, the navigation system 21 sets a driving route from the current position of the vehicle M to the destination on a road map. The drive assist controller 11 sets a target progression route (target traveling route) for allowing the vehicle M to autonomously drive along the driving route within a certain distance range in front of the vehicle M. At that time, for example, as illustrated in FIG. 10, in the case where the target progression route is set in the direction of turning left ahead, the drive assist controller 11 transmits an ON signal for blinking the left front and rear turn signal lamps Lfl and Lrl to the turn signal drive unit 31, before the point at which the vehicle M turns left. By blinking the left front and rear turn signal lamps Lfl and Lrl, vehicles around the vehicle M are informed that the vehicle M intends to turn left.

Figure 11:
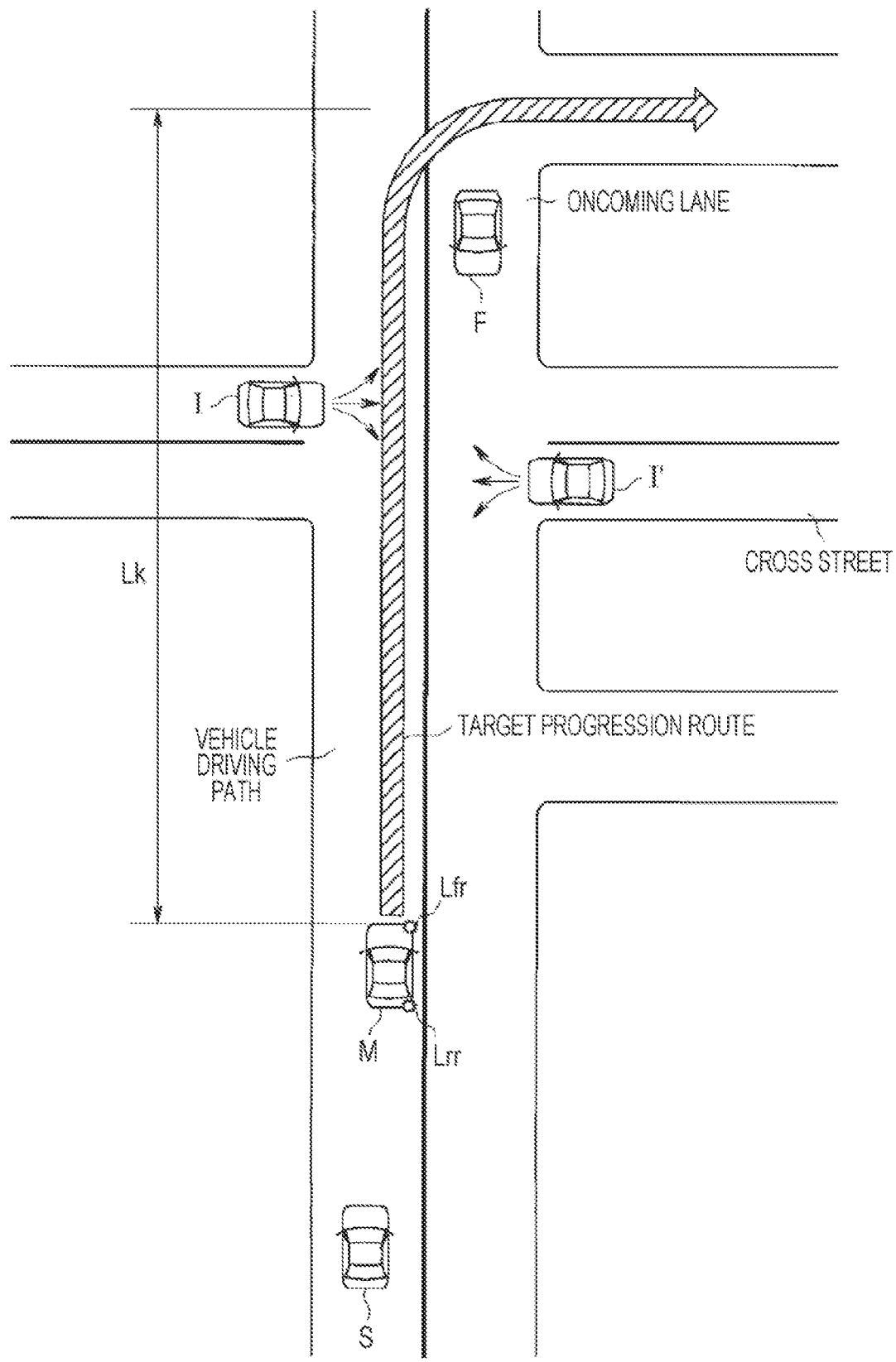
FIG. 11 is a bird's eye view illustrating the blinking state of the turn signal lamps when the vehicle intends to turn right by autonomous driving.

Likewise, as illustrated in FIG. 11, in the case where the target progression route is set in the direction of turning right, the drive assist controller 11 sends an ON signal for blinking the right front and rear turn signal lamps Lfr and Lrr to the turn signal drive unit 31, before the point at which the vehicle M turns right. By blinking the right front and rear turn signal lamps Lfr and Lrr, vehicles around the vehicle M are informed that the vehicle M intends to turn right.

By the way, if the vehicle M intends to turn right or left, it is prescribed by law in advance how many meters before the intersection at which the vehicle M intends to turn right or left the turn signal lamps Lfr and Lrr or Lfl and Lrl start blinking. Therefore, in the case where it is determined based on the map information of the camera unit 23 and the navigation system 21 that the vehicle M has reached a predetermined distance before the intersection, the drive assist controller 11 sends an ON signal to the turn signal drive unit 31.

In that case, the drive assist controller 11 sends an ON signal for the left front and rear turn signal lamps Lfl and Lrl to the turn signal drive unit 31 when the vehicle M has reached a pre-set blinking start distance (such as 30 [m]) before the intersection at which the vehicle M intends to turn left. As a result, the left front and rear turn signal lamps Lfl and Lrl start blinking. At that time, for example, as illustrated in FIG. 10, there may be one or more cross streets between the blinking start distance and the intersection at which the vehicle M intends to turn left, and, from at least one of these cross streets, a vehicle (crossing vehicle I) may be about to enter the lane where the vehicle M is driving.

In such a case, a driver who drives the crossing vehicle I is unable to clearly determine at which intersection the other vehicle (vehicle M) intends to turn left. Therefore, if the driver of the crossing vehicle I thinks that the other vehicle (vehicle M) will turn on the cross street before the intersection at which the vehicle M actually intends to turn left, and emerges onto the driving lane of the vehicle M, the drive assist controller 11, in an attempt to avoid a collision, sends an autonomous emergency braking (AEB) signal to the brake drive unit 34 to make an emergency stop, thus causing the drivers to panic.

As illustrated in FIG. 11, the same may occur in the case where, when the vehicle M intends to turn right, in addition to the above-described crossing vehicle I on the vehicle driving road side, a crossing vehicle I' intending to turn right from a cross street on the oncoming lane side may emerge onto the lane where the vehicle M is driving. Furthermore, if an oncoming vehicle F is driving in the oncoming lane when the vehicle M intends to turn right at an intersection, a driver who drives the oncoming vehicle F is unable to determine at which intersection the other vehicle (vehicle M) will turn right, and may feel anxious.

In addition, as illustrated in FIG. 10 or FIG. 11, in the case where the following vehicle S is following the vehicle M, if the preceding vehicle (vehicle M) is driving while blinking the left rear turn signal lamp Lrl or the right rear turn signal lamp Lrr, it is not clear for a driver who drives the following vehicle S at which intersection the preceding vehicle (vehicle M) intends to turn, which will irritate the driver of the following vehicle S.

Accordingly, in the present embodiment, by making the blinking cycle of the turn signal lamps Lw on the front side and the rear side variable according to the situation, the crossing vehicle I (or I'), the oncoming vehicle F, and the following vehicle S are visually informed of the intersection at which the vehicle M intends to turn.

Figure 2A:
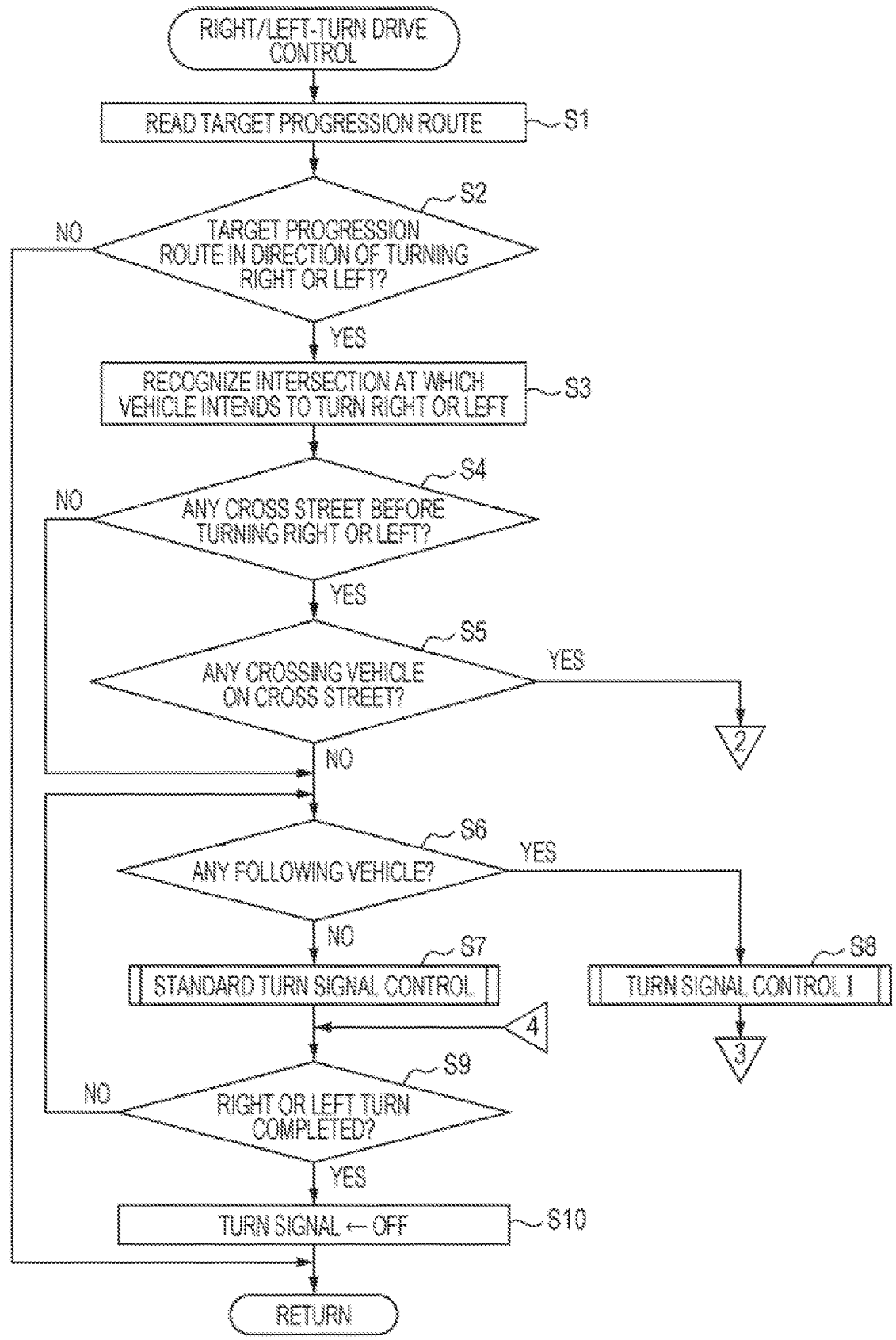
FIG. 2A is a flowchart (part 1) illustrating a right/left-turn drive control routine.
Figure 2B:
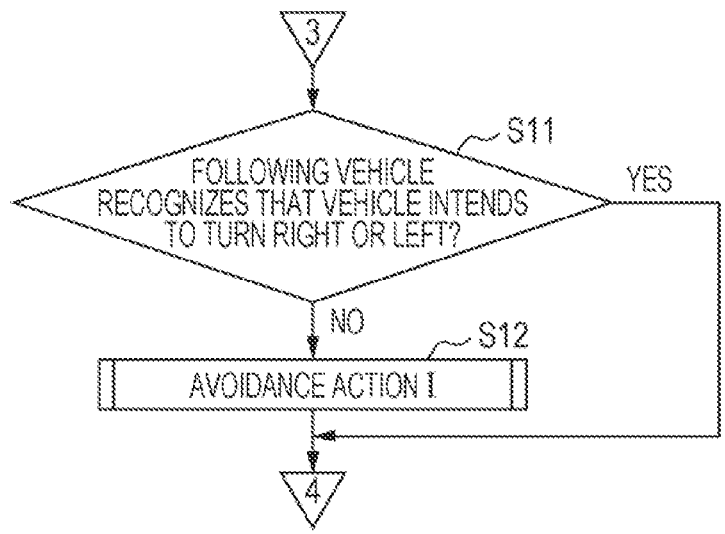
FIG. 2B is a flowchart (part 2) illustrating the right/left-turn drive control routine.
Figure 2C:
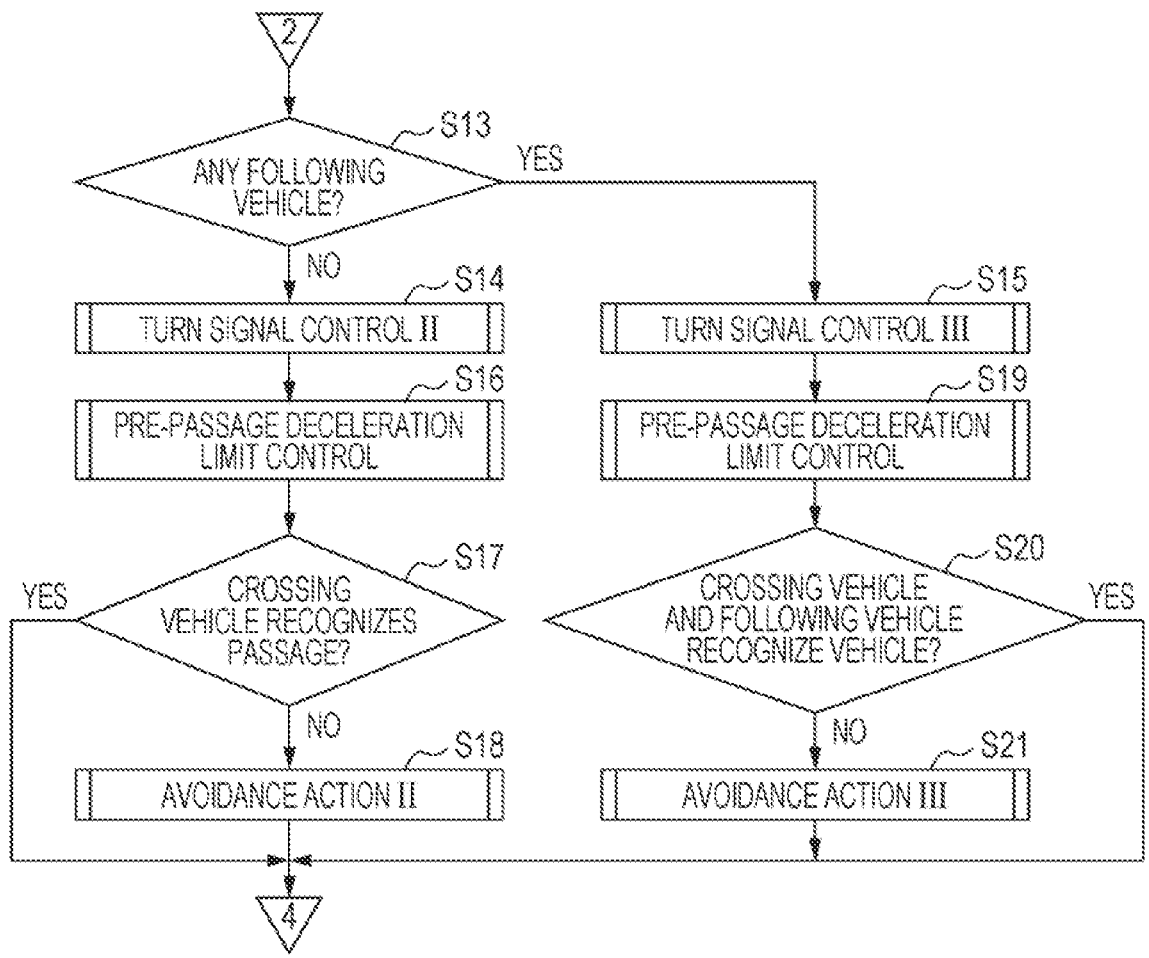
FIG. 2C is a flowchart (part 3) illustrating the right/left-turn drive control routine.

Control for making the blinking cycle of the turn signal lamps Lw variable when turning right or left, which is executed by the drive assist controller 11, is executed, in one example, in the flow of a right/left-turn drive control routine illustrated in FIGS. 2A to 2C.

In the routine, first, in step S1, the drive assist controller 11 reads a target progression route set based on a driving route set by the navigation system 21. Next, the routine proceeds to step S2, where it is examined whether the target progression route is set in the direction of turning right or left or in the straight direction. Then, if the target progression route is set in the direction of turning right or left, the routine proceeds to step S3. Alternatively, if the target progression route is set in the straight direction, the routine is exited.

Proceeding to step S3, an intersection at which the vehicle M turns right or left, which is set in the target progression route, is recognized. The recognition of the intersection is obtained from map information of the navigation system 21. Alternatively, the intersection is recognized based on preceding environment information of the vehicle M obtained by the camera unit 23.

Next, the routine proceeds to step S4, where it is examined whether there is a cross street leading to the vehicle driving path, from the recognized intersection at which the vehicle M turns right or left to the blinking start distance (such as 30 [m]) before the intersection. Whether there is such a cross street is determined based on the map information of the navigation system 21 or the preceding environment information of the vehicle M, which is obtained by the camera unit 23.

If there is no cross street, the routine jumps to step S6. Alternatively, if a cross street is recognized, the routine proceeds to step S5. In step S5, it is examined whether there is, on the cross street, a vehicle (crossing vehicle) I (or I') that is about to enter in the direction of the vehicle driving path. Whether there is the crossing vehicle I (or I') is recognized using known template matching processing, feature point detection processing, etc. based on the preceding environment information of the vehicle M, which is obtained by the camera unit 23.

If no crossing vehicle has been detected, the routine proceeds to step S6. Alternatively, if the crossing vehicle I (or I') has been detected, the routine jumps to step S13. Proceeding to step S6, the presence or absence of the following vehicle S driving within a certain range from the vehicle M is examined. The presence or absence of following vehicle S is examined based on information from the following vehicle detector 24b of the rear detection unit 24. If there is no following vehicle, the routine proceeds to step S7; and, if the following vehicle S has been detected, the routine branches to step S8.

Proceeding to step S7, the drive assist controller 11 executes a standard turn signal control process, and proceeds to step S9. The standard turn signal control process executed by the drive assist controller 11 first sends an ON signal with a standard blinking cycle to the turn signal drive unit 31 in order to blink the turn signal lamps Lw in the direction in which the target progression route is about to turn, and causes the front and rear turn signal lamps in the turning direction (the left front and rear turn signal lamps Lfl and Lrl in FIG. 10 or the right front and rear turn signal lamps Lfr and Lrr in FIG. 11) to operate at a constant cycle (for example, 90 blinks/60 [sec]). As a result, the vehicle M blinks the turn signal lamps Lw on the turning side (right turn or left turn) at the standard blinking cycle from a certain blinking start distance, and then turns at the intersection.

Figure 3:
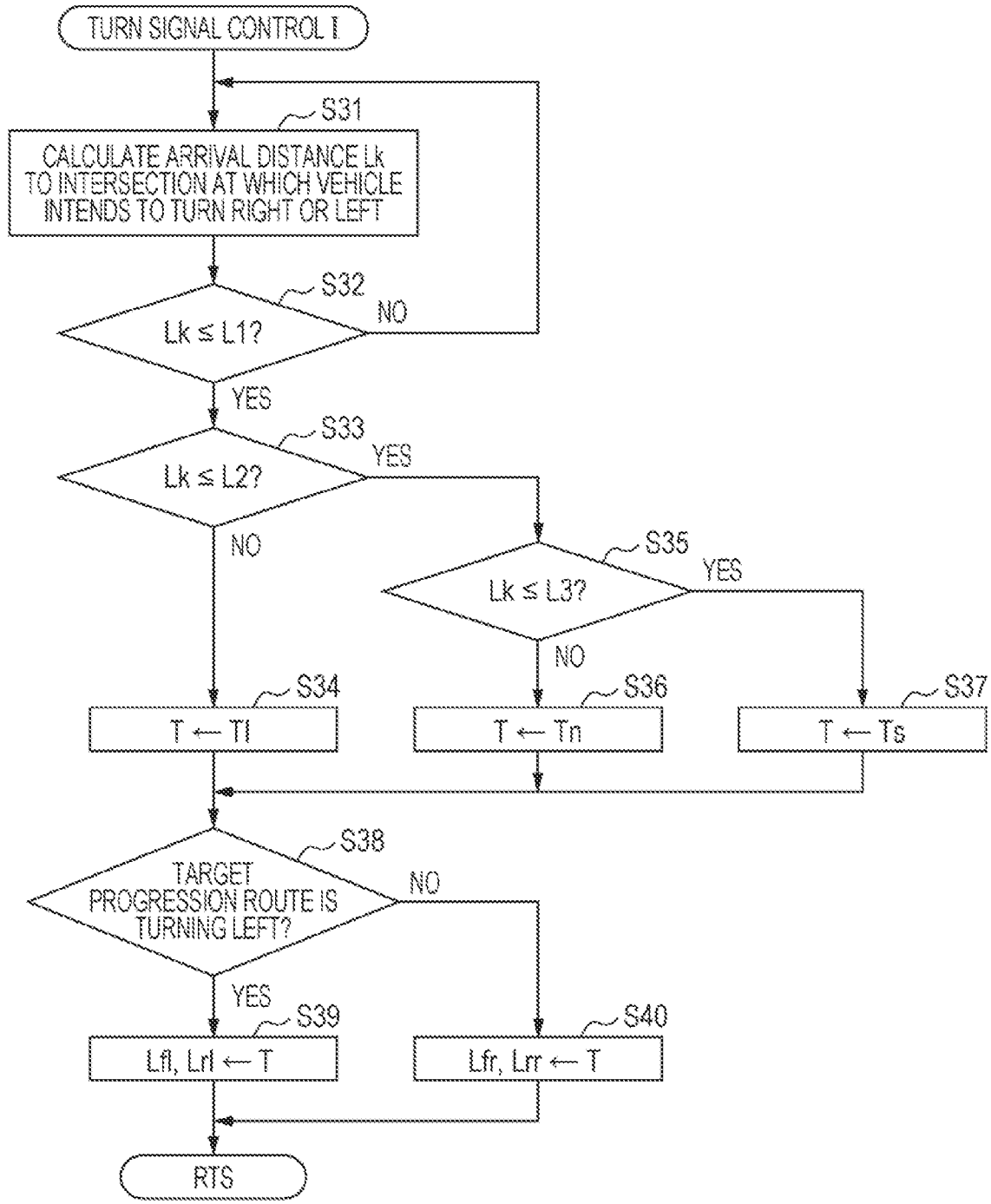
FIG. 3 is a flowchart illustrating a turn signal control I subroutine.

Meanwhile, when the routine branches from step S6 to step S8, turn signal control I is executed, and then the routine proceeds to step S11. In the turn signal control I, a turn signal control I subroutine illustrated in FIG. 3 is executed. Note that, in one embodiment, the processing in FIG. 3 and in later-described FIGS. 4 and 5 may serve as a process performed by a "blinking cycle adjuster".

In the subroutine, first, in step S31, an arrival distance Lk from the vehicle position to the intersection at which the vehicle M turns right or left, which is set in the target progression route, is calculated. The arrival distance Lk is calculated based on the map information of the navigation system 21 or the preceding environment information of the vehicle M, which is obtained by the camera unit 23.

Next, the subroutine proceeds to step S32, where the arrival distance Lk and a first threshold distance L1 are compared. The first threshold distance L1 is the above-described blinking start distance, and is, for example, 30 [m]. In step S32, the subroutine waits until the arrival distance Lk reaches the first threshold distance L1. Then, when the arrival distance Lk reaches the first threshold distance L1 (Lk≤L1), the subroutine proceeds to step S33.

In step S33, the arrival distance Lk and a second threshold distance L2 are compared. The second threshold distance L2 is, for example, 20 [m].

Then, when the arrival distance Lk has not yet reached the second threshold distance L2 (Lk>L2), the subroutine proceeds to step S34, where a blinking cycle T is set at a long blinking cycle Tl (T←Tl), and proceeds to step S38.

Thereafter, when the arrival distance Lk reaches the second threshold distance L2 (Lk<L2), the subroutine branches to step S35, where the arrival distance Lk and a third threshold distance L3 are compared. The third threshold distance L3 is, for example, 10 [m].

Then, when the arrival distance Lk has not yet reached the third threshold distance L3 (Lk>L3), the subroutine proceeds to step S36, where the blinking cycle T is set at a standard blinking cycle Tn (T←Tn), and proceeds to step S38. Thereafter, when the arrival distance Lk reaches the third threshold distance L3 (Lk≤L3), the subroutine branches to step S37, where the blinking cycle T is set at a short blinking cycle Ts (T←Ts), and proceeds to step S38.

Figure 12:
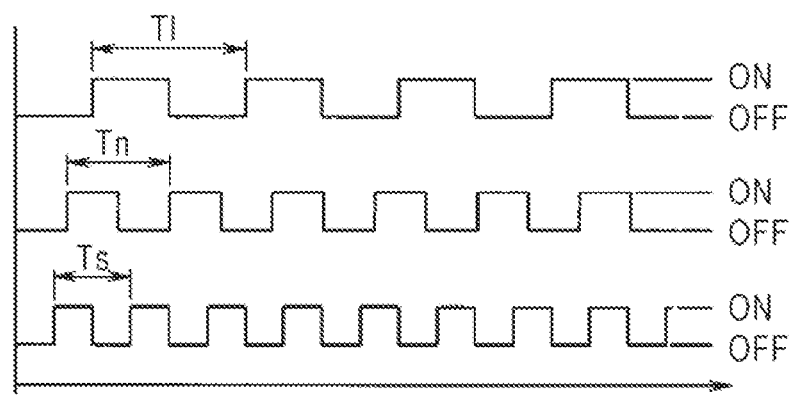
FIG. 12 is an explanatory diagram illustrating the blinking cycles of the turn signal lamps.

As illustrated in FIG. 12, the blinking cycle set in step S7 described above and the blinking cycle T set in step S34 are the standard blinking cycle Tn. In the present embodiment, when the standard blinking cycle Tn where the ON time and the OFF time are the same is set to, for example, 90 blinks/60 [sec], the long blinking cycle Tl is set to 60 blinks/60 [sec], and the short blinking cycle Ts is set to 120 blinks/60 [sec]. However, this is merely an example, and, as long as the relationship Tl>Tn>TS holds true, the blinking cycle T is appropriately set to the optimal state according to the recognition degree of the driver or the like.

Thereafter, proceeding to step S38 from any of steps S34, S36, and S37, it is examined whether the target progression route is set in the direction of turning left (see FIG. 10) or right (see FIG. 11) at the intersection. If the target progression route is set in the direction of turning left, the subroutine proceeds to step S39, where an ON signal for blinking the left front and rear turn signal lamps Lfl and Lrl at the blinking cycle T is sent to the turn signal drive unit 31, and proceeds to step S11 in FIG. 2B. Alternatively, if the target progression route is set in the direction of turning right, the subroutine branches to step S40, where an ON signal for blinking the right front and rear turn signal lamps Lfr and Lrr at the blinking cycle T is sent to the turn signal drive unit 31, and proceeds to step S11.

As a result, in the case where there is no crossing vehicle I (or I') on the cross street, but the following vehicle S follows the vehicle M, the blinking cycle T of the turn signal lamps Lw in the turning direction is set at the long blinking cycle Tl when the arrival distance Lk to the intersection at which the vehicle M intends to turn is between the first threshold distance L1 and the second threshold distance L2, which allows the driver of the following vehicle S to visually recognize that there still is an enough distance to the intersection at which the preceding vehicle (vehicle M) intends to turn.

Thereafter, when the arrival distance Lk to the intersection at which the vehicle M intends to turn is between the second threshold distance L2 and the third threshold distance L3, the blinking cycle T of the turn signal lamps Lw in the turning direction is set at the standard blinking cycle Tn, which allows the driver of the following vehicle S to visually recognize that the preceding vehicle (vehicle M) is approaching the intersection at which the vehicle M intends to turn.

Furthermore, when the arrival distance Lk to the intersection at which the vehicle M intends to turn is shorter than the third threshold distance L3, the blinking cycle T of the turn signal lamps Lw in the turning direction is set at the short blinking cycle Ts, which allows the driver of the following vehicle S to easily predict that the preceding vehicle (vehicle M) intends to turn at the next intersection. As a result, without irritating the driver of the following vehicle S, the drive assist controller 11 allows the vehicle M to drive safely to the intersection at which the vehicle M intends to turn, and to turn smoothly at the intersection.

Meanwhile, proceeding from step S8 to S11, it is examined whether the following vehicle S recognizes the timing at which the vehicle M turns right or left. Whether the following vehicle S recognizes the timing at which the vehicle M turns right or left is determined based on the vehicle-to-vehicle distance between the vehicle M and the following vehicle S and the relative vehicle speed, which are calculated based on following vehicle information obtained by the following vehicle detector 24b of the rear detection unit 24.

At that time, if the following vehicle S does not decelerate and approaches the vehicle M even though the vehicle M has executed the turn signal control I, it is determined that the following vehicle S does not recognize the timing at which the vehicle M turns right or left, and the subroutine proceeds to step S12. In contrast, if the following vehicle S decelerates as it follows the vehicle M, it is determined that the following vehicle S recognizes the timing at which the vehicle M turns right or left, and the subroutine proceeds to step S9.

Figure 6:
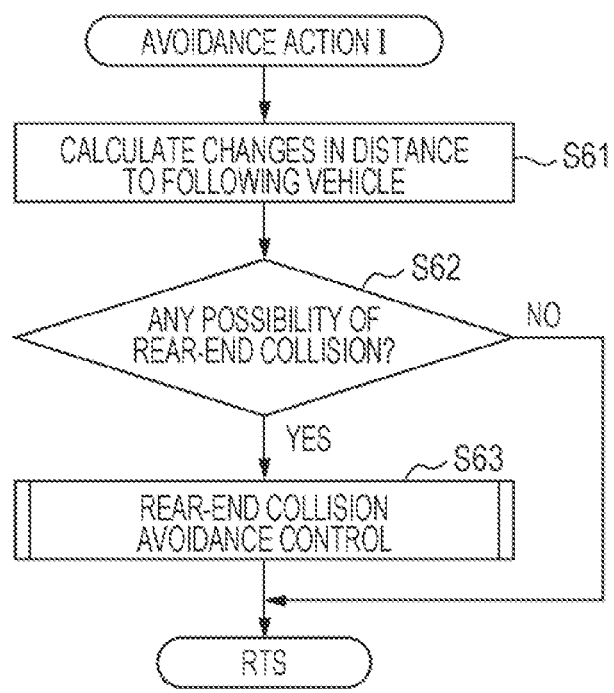
FIG. 6 is a flowchart illustrating an avoidance action I subroutine.

Avoidance action I performed in step S12 is processed according to an avoidance action I subroutine illustrated in FIG. 6. In the subroutine, first, in step S61, the vehicle-to-vehicle distance between the vehicle M and the following vehicle S is monitored, and changes thereof are calculated. Changes in the vehicle-to-vehicle distance are calculated from differences in the vehicle-to-vehicle distance with the following vehicle S for each calculation cycle, obtained by the following vehicle detector 24b of the rear detection unit 24.

Then, the subroutine proceeds to step S62, where it is determined that there is a possibility of a rear-end collision when the following vehicle S is approaching the vehicle M, and proceeds to step S63. Meanwhile, in the case where the vehicle-to-vehicle distance between the following vehicle S and the vehicle M has not been narrowed, it is determined that there is no possibility of a rear-end collision, and the subroutine proceeds to step S9 in FIG. 2A. Proceeding to step S63, the subroutine executes rear-end collision avoidance control, and proceeds to step S9 in FIG. 2A.

In step S63, the rear-end collision avoidance control reconfigures a target progression route for avoiding a rear-end collision. In the reconfiguration of the target progression route, for example, a search for an intersection at which the vehicle M turns right or left, beyond the intersection at which the vehicle M turns right or left along the original target progression route, is conducted to configure a new target progression route. Alternatively, in the case where the driving road where the vehicle M is driving has multiple lanes, a target progression route where the vehicle M changes lanes to a lane different from the following vehicle S is configured. Then, after executing the rear-end collision avoidance control, the subroutine proceeds to step S9 in FIG. 2A.

In contrast, when the routine determines in step S5 that there is the crossing vehicle I (or I') on the cross street and branches to step S13, the presence or absence of the following vehicle S which is driving within a certain range from the vehicle M is examined, as in step S6 described above. Then, when there is no following vehicle, the subroutine proceeds to step S14; and, when the following vehicle S has been detected, the subroutine branches to step S15.

Proceeding to step S14, the subroutine executes turn signal control II, and proceeds to step S16. Alternatively, when the subroutine branches to step S15, the subroutine executes turn signal control III, and proceeds to step S19.

Figure 4:
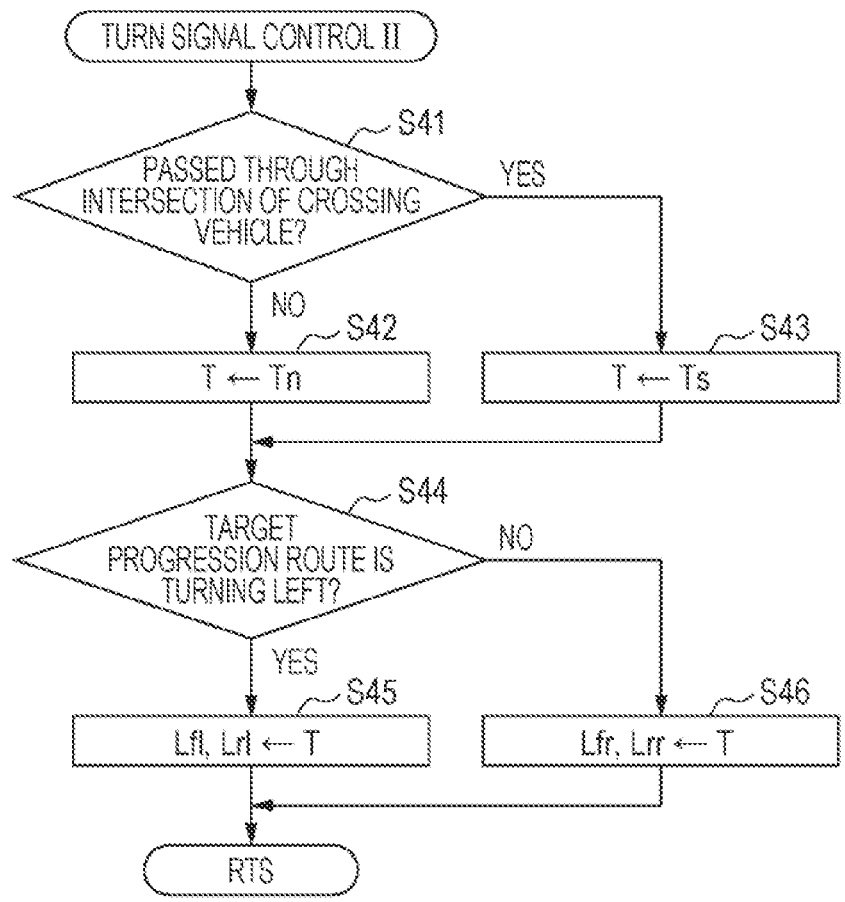
FIG. 4 is a flowchart illustrating a turn signal control II subroutine.

The turn signal control II executed in step S14 is processed according to a turn signal control II subroutine illustrated in FIG. 4.

In the subroutine, first, in step S41, it is examined whether the vehicle M has passed through an intersection that the crossing vehicle I (or I') is about to enter. Whether the vehicle M has passed through this intersection is determined by predicting the arrival distance based on the preceding environment information of the vehicle M, which is obtained by the camera unit 23.

Then, in the case where it is determined that the vehicle M is still driving before the intersection, the subroutine proceeds to step S42, where the blinking cycle T is set at the standard blinking cycle Tn (T-Tn), and proceeds to step S44. Then, in the case where the vehicle M has passed through the intersection that the crossing vehicle I (or I') is about to enter, the subroutine branches to step S43, where the blinking cycle is set at the short blinking cycle (T←Ts), and proceeds to step S44.

Proceeding to step S44 from step S42 or S43, it is examined whether the target progression route is set in the direction of turning left at the intersection. In the case where the target progression route is set in the direction of turning left, the subroutine proceeds to step S45. Alternatively, in the case where the target progression route is set in the direction of turning right, the subroutine branches to step S46.

Proceeding to step S45, the subroutine sends an ON signal for blinking the left front and rear turn signal lamps Lfl and Lrl at the blinking cycle T to the turn signal drive unit 31, and proceeds to step S16. Meanwhile, proceeding to step S46, the subroutine sends an ON signal for blinking the right front and rear turn signal lamps Lfr and Lrr at the blinking cycle T to the turn signal drive unit 31, and proceeds to step S16.

Then, the drive assist controller 11 blinks the turn signal lamps Lw in the turning direction at the standard blinking cycle Tn (see FIG. 12) after the vehicle M approaches the intersection of the cross street where the crossing vehicle I (or I'), which is about to enter the driving path of the vehicle M, is recognized until the vehicle M passes through the intersection. Because the turn signal lamps Lw are blinking at the blinking cycle T, the driver of the crossing vehicle I (or I') is able to visually grasp that the other vehicle (vehicle M) which is approaching will pass through the cross street of the vehicle (crossing vehicle I or I').

Thereafter, the vehicle M passes through the cross street from which the crossing vehicle I (or I') is about to enter, and the turn signal lamps Lw in the turning direction blink at the blinking cycle T set at the short blinking cycle Ts (see FIG. 12). Therefore, in the case where the crossing vehicle I (or I') is driving in the direction following the other vehicle (vehicle M), the driver of the crossing vehicle I (or I') is able to grasp that a cross street where the preceding vehicle (vehicle M) intends to turn is approaching, thereby preventing a rear-end collision beforehand.

Figure 7:
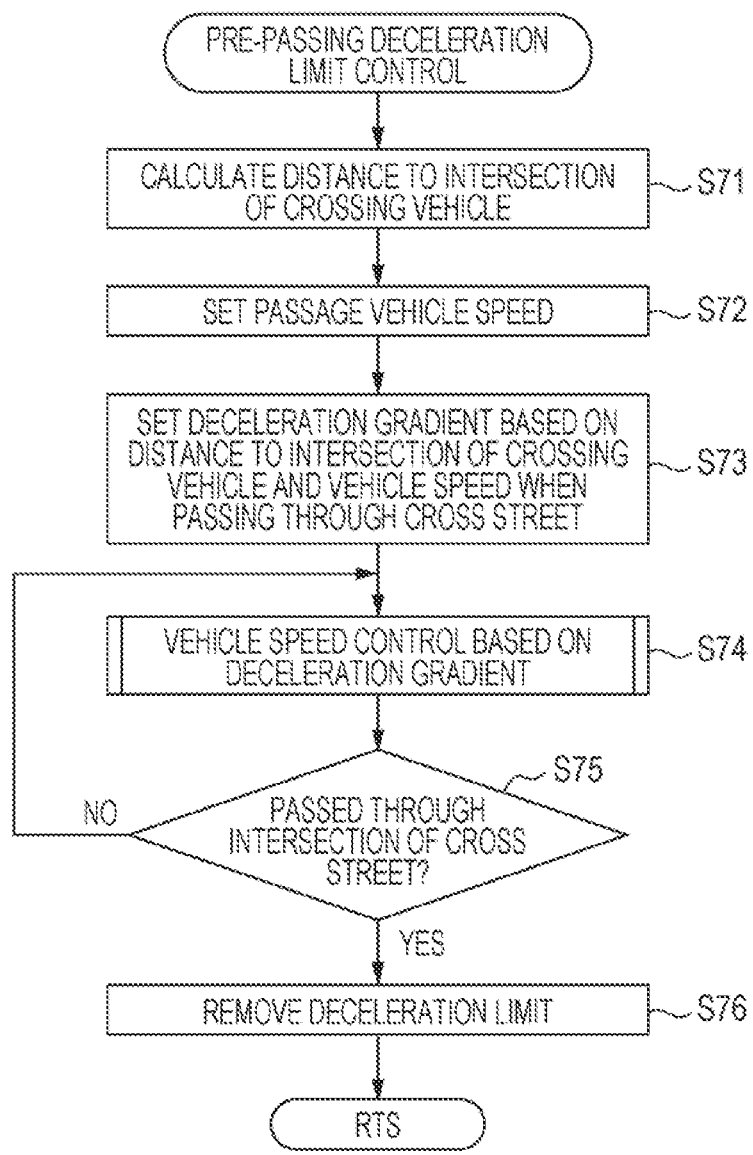
FIG. 7 is a flowchart illustrating a pre-passage deceleration limit control subroutine.

Then, proceeding to step S16 in FIG. 2C, the routine executes a pre-passage deceleration limit control process, and proceeds to step S17. The pre-passage deceleration limit control process is executed according to a before-deceleration passage limiting process subroutine illustrated in FIG. 7. Note that, in one embodiment, the processing in this subroutine may serve as a process performed by a "deceleration limit controller".

In the subroutine, first, in step S71, the distance from the vehicle M to the intersection at which the crossing vehicle I (or I') is about to enter is calculated based on the preceding environment information of the vehicle M, which is obtained by the camera unit 23. Next, in step S72, the vehicle speed (passage vehicle speed) at which the vehicle M passes through the cross street of the crossing vehicle I (or I') is set. The passage vehicle speed is a speed at which the driver of the crossing vehicle I (or I') will not misunderstand that the other vehicle (vehicle M) will turn on the cross street of the crossing vehicle I (or I') or a cross street before that, and is set in advance to 30 to 20 [Km/h] or the like.

The subroutine then proceeds to step S73, where, based on the distance to the intersection of the crossing vehicle I (or I') calculated in step S71, the passage vehicle speed set in step S72, and the current vehicle speed detected by the vehicle speed sensor 25, a deceleration gradient for decelerating the current vehicle speed to the passage vehicle speed is set. Then, the subroutine proceeds to step S74, where vehicle speed control for limiting the deceleration of the vehicle speed according to the deceleration gradient is executed, and proceeds to step S75.

As a result, the driver of the crossing vehicle I (or I') which is about to enter the driving path of the vehicle M from the cross street is able to visually recognize the blinking of the turn signal lamps Lw of the approaching other vehicle (vehicle M). Moreover, because the other vehicle (vehicle M) passes through without greatly decelerating its vehicle speed, the assumption that the other vehicle (vehicle M in this case) will make a turn before the vehicle (crossing vehicle I or I' in this case) or on the cross street of the vehicle (vehicle I or I') can be eliminated.

Thereafter, proceeding to step S75, the vehicle speed control in step S74 is repeatedly executed until the vehicle M passes through the cross street of the crossing vehicle I (or I'). Then, when the drive assist controller 11 determines that the vehicle M has passed through the cross street of the crossing vehicle I (or I'), the subroutine proceeds to step S76, where the deceleration limit based on the deceleration gradient is removed, and proceeds to step S17 in FIG. 2C.

In step S17 in FIG. 2C, it is estimated whether the driver of the crossing vehicle I (or I') is waiting for the passage of the vehicle M. Whether the driver of the crossing vehicle I (or I') is waiting for the passage of the vehicle M is estimated from, for example, the behavior of the crossing vehicle I (or I') monitored based on the preceding environment information of the vehicle M, which is obtained by the camera unit 23. That is, in the case where the crossing vehicle I (or I') is stopped on the cross street, it is estimated that the driver of the crossing vehicle I (or I') recognizes the passage of the vehicle M. Alternatively, in the case where the crossing vehicle I (or I') is moving in the direction of the vehicle driving path, it is estimated that the driver of the crossing vehicle I (or I') has misunderstood that the vehicle M will be turning right or left on the cross street of the crossing vehicle I (or I') or on a cross street before that.

Figure 8:
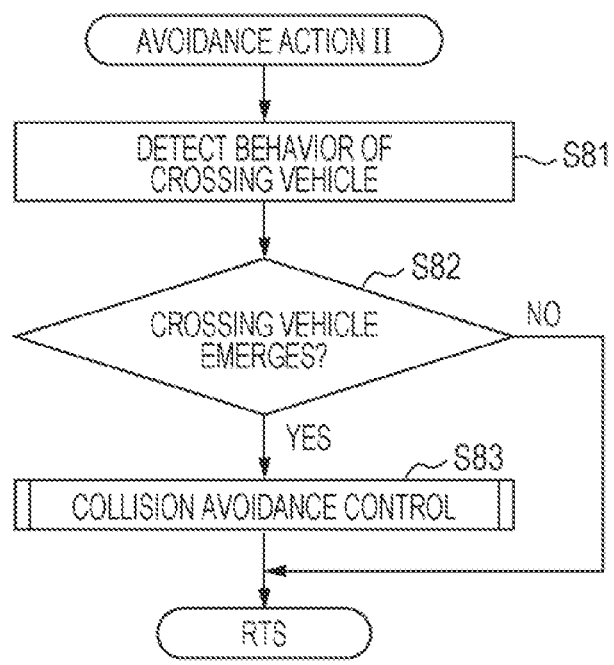
FIG. 8 is a flowchart illustrating an avoidance action II subroutine.

In the case where it is estimated that the driver of the crossing vehicle I (or I') is waiting for the passage of the vehicle M, the routine proceeds to step S9. Alternatively, in the case where the driver of the crossing vehicle I (or I') has misunderstood, the routine proceeds to step S18. In step S18, avoidance action II is performed, and the routine proceeds to step S9. The avoidance action II is performed according to an avoidance action II subroutine illustrated in FIG. 8.

In the subroutine, first, in step S81, the behavior of the crossing vehicle I (or I') is detected. The behavior of the crossing vehicle I (or I') is examined based on the amount of movement per calculation cycle of the crossing vehicle I (or I') obtained based on the preceding environment information of the vehicle M, which is obtained by the camera unit 23. Next, the subroutine proceeds to step S82, where it is examined whether any crossing vehicle I (or I') emerges onto the driving path of the vehicle M (vehicle driving path). In the case where the crossing vehicle I (or I') remains within the cross street, it is determined that there is no possibility of emergence of the crossing vehicle I (or I'), and proceeds to step S9 in FIG. 2A. Alternatively, in the case where any crossing vehicle I (or I') emerges onto the vehicle driving path, the subroutine proceeds to step S83.

In step S83, collision avoidance control is executed, and the subroutine proceeds to step S9 in FIG. 2A. First, the collision avoidance control examines, from the behavior of the emerging crossing vehicle I (or I'), the direction in which the crossing vehicle I (or I') intends to progress (whether the direction is turning right, going straight, or turning left, as in FIGS. 10 and 11).

Then, in the case where the crossing vehicle I illustrated in FIG. 10 intends to turn left, the drive assist controller 11, in an attempt to cause the vehicle M to follow the crossing vehicle I, sends a braking signal to the brake drive unit 34 to decelerate the vehicle M, and the subroutine proceeds to step S9 in FIG. 2A. At the same time, in the case where it is determined, based on the relationship between the current vehicle speed and the distance from the position of the vehicle M to the crossing vehicle I, that there is a high possibility of collision even if the vehicle M is decelerated rapidly, the drive assist controller 11 reconfigures a new target progression route for avoiding a collision, and the subroutine proceeds to step S9 in FIG. 2A.

In the reconfiguration of the target progression route, for example, as illustrated in FIG. 10, in the case where an oncoming lane is set to the cross street where the crossing vehicle I is driving, the target progression route is reconfigured in the direction of turning left onto this oncoming lane. Alternatively, if the road of the vehicle driving path has two lanes on each side, the target progression route where the course is changed to the lane on the center line side is reconfigured, and then, if a left turn is possible, the target progression route may be returned to the original target progression route.

In contrast, in FIG. 10, in the case where the crossing vehicle I intends to go straight or turn right, after the drive assist controller 11 detects the emergence of the crossing vehicle I, the drive assist controller 11 sends a braking signal to the brake drive unit 34 to start deceleration. Then, after confirming that the crossing vehicle I has crossed the driving path of the vehicle M (vehicle driving path), the drive assist controller 11 sends a signal for relieving the deceleration to the brake drive 34, and then causes the vehicle M to drive along the original target progression route.

In contrast, as in the crossing vehicle I' illustrated in FIG. 11, because the crossing vehicle I' emerges from the cross street on the oncoming lane side onto the oncoming lane, but does not emerge onto the vehicle driving path, the subroutine proceeds from step S82 to step S9 in FIG. 2A. In contrast, in the case where the crossing vehicle I' intends to turn right or go straight, the crossing vehicle I' will emerge onto the vehicle driving path, and thus the subroutine proceeds from step S82 to step S83. In that case, when the crossing vehicle I' intends to turn right, as in the above-described case where the crossing vehicle I intends to turn left, the drive assist controller 11, in an attempt to cause the vehicle M to follow the crossing vehicle I', sends a braking signal to the brake drive unit 34 to decelerate the vehicle M, and the subroutine proceeds to step S9 in FIG. 2A.

At that time, in the case where, based on the relationship between the current vehicle speed and the distance from the position of the vehicle M to the crossing vehicle I' emerging onto the vehicle driving path, there is a high possibility of collision even if the vehicle M is decelerated rapidly, the drive assist controller 11 reconfigures a new target progression route for avoiding a collision, and the subroutine proceeds to step S9 in FIG. 2A.

In the reconfiguration of the target progression route, for example, in the case where the road of the vehicle driving path has two lanes on each side and the crossing vehicle I' intends to turn right, the target progression route where the course is changed to the lane on the shoulder side is reconfigured to avoid a collision with the crossing vehicle I'. In contrast, in the case where the crossing vehicle I' intends to go straight, the target progression route is set toward the center line while rapidly decelerating the vehicle M, thereby avoiding a collision with the crossing vehicle I'.

Figure 5:
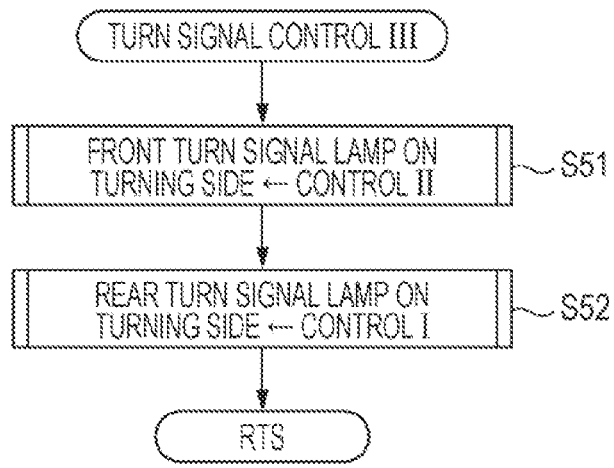
FIG. 5 is a flowchart illustrating a turn signal control III subroutine.

Meanwhile, the turn signal control III in step S15 is executed according to a turn signal control III subroutine illustrated in FIG. 5.

In the subroutine, first, in step S51, the front turn signal lamp Lfl or Lfr on the turning side (right turn or left turn) is blinked at the blinking cycle T set by the turn signal control II subroutine. Next, the subroutine proceeds to step S52, where the rear turn signal lamp Lrl or Lrr on the turning side (right turn or left turn) is blinked at the blinking cycle set by the turn signal control III subroutine. Then, the subroutine proceeds to step S19 in FIG. 2C.

As described above, in the present embodiment, in the case where the crossing vehicle I (or I') has been recognized ahead and the following vehicle S has been detected behind, the turn signal lamps Lw on the front side and the rear side in the turning direction are blinked at different blinking cycles. Therefore, the intersection at which the vehicle M will turn can be clearly indicated to the crossing vehicle I (or I') and to the following vehicle S.

Proceeding to step S19, the pre-passage deceleration limit control process is executed, and the routine proceeds to step S20. The pre-passage deceleration limit control process is executed according to the before-deceleration passage limiting process subroutine illustrated in FIG. 7. Since this subroutine has already been described, a description thereof is omitted here.

Proceeding to step S20, it is examined whether the driver of the crossing vehicle I (or I') and the driver of the following vehicle S recognize the vehicle M. That is, even when the turn signal lamps are blinked by the turn signal control III to indicate to the crossing vehicle I (or I') and to the following vehicle S the timing at which the vehicle M enters the cross street on which the vehicle M turns right or left, if any crossing vehicle I (or I') emerges onto the driving path of the vehicle M or the distance between the vehicle M and the following vehicle S has been narrowed, or in the case of both, the routine proceeds to step S21, where avoidance action III is performed, and proceeds to step S9 in FIG. 2A.

Alternatively, in the case where it is determined that both the crossing vehicle I and the following vehicle S recognize the vehicle M, the routine proceeds to step S9 in FIG. 2A as it is.

Figure 9:
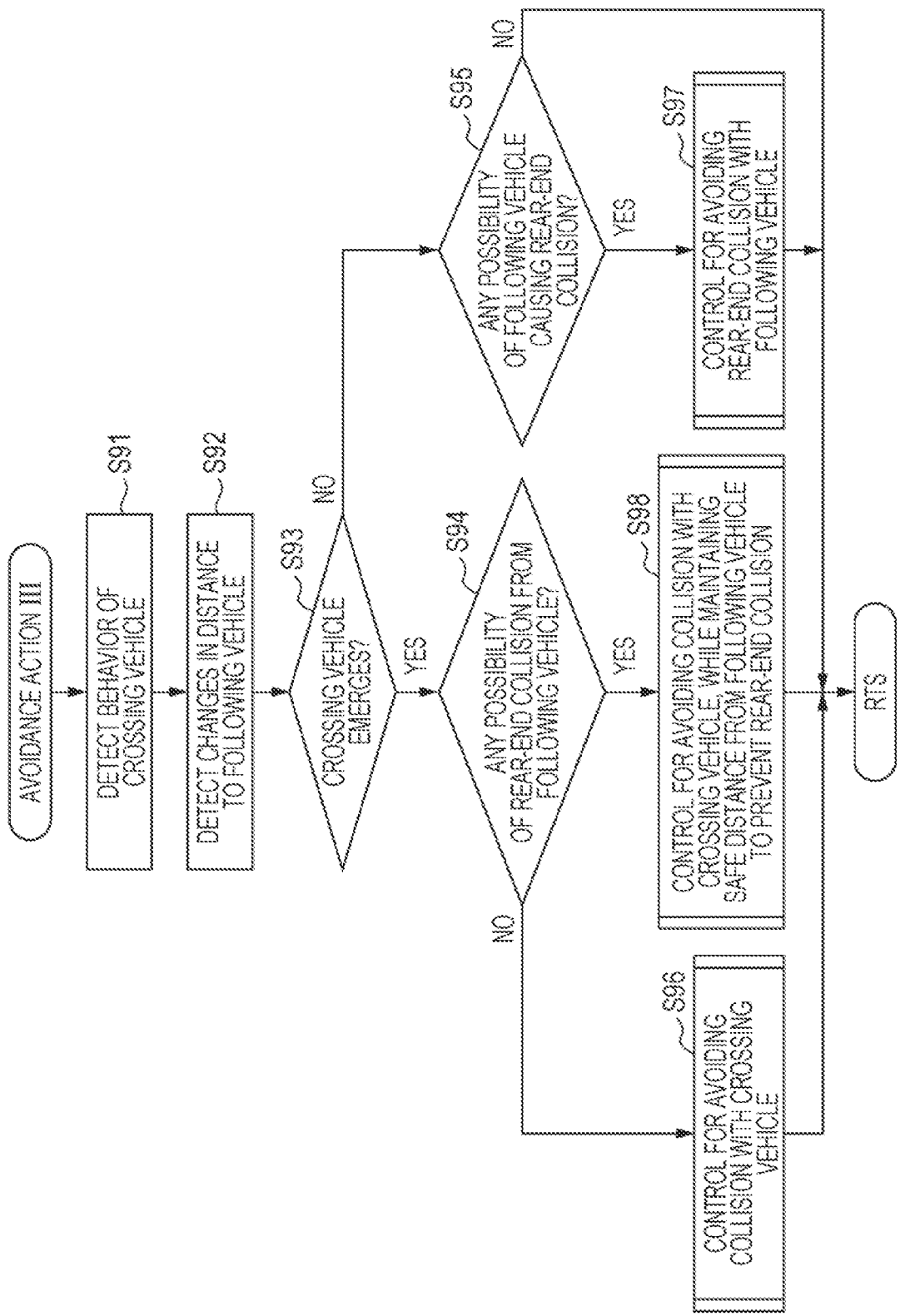
FIG. 9 is a flowchart illustrating an avoidance action III subroutine.

The avoidance action III in step S21 is performed according to an avoidance action III subroutine illustrated in FIG. 9. In the subroutine, first, in step S91, the behavior of the emerging crossing vehicle I or I' is detected by executing the same processing as step S81 in FIG. 8 described above. Next, the subroutine proceeds to step S92, where changes in the vehicle-to-vehicle distance between the vehicle M and the following vehicle S are detected by executing the same processing as step S61 described above.

Thereafter, the subroutine proceeds to step S93, where it is examined whether the crossing vehicle I (or I') emerges onto the driving path of the vehicle M (vehicle driving path). Then, in the case where it is determined that any crossing vehicle I (or I') has emerged, the subroutine proceeds to step S94. Alternatively, in the case where the crossing vehicle I (or I') remains within the cross street, it is determined that there is no possibility of emergence of the crossing vehicle I (or I'), and the subroutine branches to step S95.

Proceeding to step S94, the possibility of the vehicle M being rear-ended by the following vehicle S is examined. In the case where the vehicle-to-vehicle distance between the following vehicle S and the vehicle M has not been narrowed, it is determined that there is no possibility of a rear-end collision, and the subroutine branches to step S96. Alternatively, in the case where the following vehicle S is approaching the vehicle M, it is determined that there is a possibility of a rear-end collision, and the subroutine proceeds to step S98. Proceeding to step S96, control for avoiding a collision with the crossing vehicle I (or I') is executed, as in step S83 described above, and the subroutine proceeds to step S9 in FIG. 2A.

In the case where the subroutine branches from step S93 to step S95, the possibility of the vehicle M being rear-ended by the following vehicle S is examined, as in step S94 described above. Then, in the case where it is determined that there is no possibility of the vehicle M being rear-ended by the following vehicle, the subroutine proceeds to step S9 in FIG. 2A. In contrast, in the case where it is determined that there is a possibility of the vehicle M being rear-ended by the following vehicle S, the subroutine proceeds to step S97. In step S97, rear-end collision avoidance control for avoiding a rear-end collision with the following vehicle S is executed, as in step S63 described above, and the subroutine proceeds to step S9 in FIG. 2A.

In the case where the subroutine proceeds from step S94 to step S98, while maintaining a safe distance from the following vehicle S to prevent a rear-end collision, collision avoidance control for avoiding a collision with the crossing vehicle I (or I') is executed, and the subroutine proceeds to step S9 in FIG. 2A. The collision avoidance control for avoiding a collision with the crossing vehicle I (or I') in step S98 is performed by executing the same processing as step S83 described above.

Then, proceeding to step S9 in FIG. 2A from any of steps S12, S18, and S21, whether the right turn or the left turn of the vehicle M has been completed is examined from a steering signal from the drive assist controller 11 to the EPS drive unit 32, and the right/left-turn drive control is continued until the right turn or the left turn is completed. Then, in the case where it is determined that the right turn or the left turn of the vehicle M has been completed, the drive assist controller 11 proceeds to step S10, where a turn signal OFF signal is sent to the turn signal drive unit 31, ends the blinking of the turn signals, and exits the routine.

As described above, in the present embodiment, when the vehicle M intends to turn right or left at an intersection ahead along the target progression route, if the crossing vehicle I (or I') is detected on a cross street before the intersection, the blinking cycle T of the turn signal lamps Lw on the turning side is made longer before the crossing vehicle I (or I'); when the vehicle M passes the crossing vehicle I (or I'), the blinking cycle T is switched to the normal blinking cycle T; and, furthermore, the blinking cycle T is made shorter before a cross street on which the vehicle M makes a turn. This can visually indicate to the driver of the crossing vehicle I (or I') that the vehicle M will not make a turn at least until the vehicle M passes the crossing vehicle I (or I').

As a result, the driver of the crossing vehicle I (or I') is prevented from misunderstanding the intersection at which the vehicle M intends to turn, thereby preventing in advance the crossing vehicle I (or I') from emerging. Therefore, the driver is no longer panicked due to the emergence of the crossing vehicle I (or I'). When the vehicle M intends to turn right, the intersection at which the vehicle M intends to turn can be visually indicated also to the oncoming vehicle F.

Furthermore, in the unlikely event that the crossing vehicle I (or I') emerges onto the driving path of the vehicle M or the following vehicle S approaches the vehicle M, the drive assist controller 11 performs an avoidance action to avoid a collision or a rear-end collision, and accordingly, the occupants of the vehicle M can be protected from a collision or a rear-end collision.

Note that the disclosure is not limited to the above-described embodiment, and, for example, the blinking cycle T of the turn signal lamps Lw may be divided into four or more stages, or may be varied continuously. Additionally, the behavior of the crossing vehicle I (or I') and the following vehicle S may be obtained based on information received by the vehicle information receiver 22 or from vehicle-to-vehicle communication and road-to-vehicle communication.

The drive assist controller illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the drive assist controller 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1. The turn signal drive unit 31, the electric power steering (EPS) drive unit 32, the power drive unit 33, and the brake drive unit 34, and the drive assist controller 11 may compose the circuitry.

The invention claimed is:

1. A drive assist apparatus for a vehicle, the drive assist apparatus comprising:
   a turn signal drive unit configured to blink turn signal lamps provided on the vehicle at certain cycles;
   an environment information obtainer configured to obtain surrounding environment information on the vehicle; and
   a controller configured to, when a target traveling route of the vehicle is set to a route at least from a current traveling street in which the vehicle travels into a first cross street that intersects the current traveling street at an intersection ahead of the vehicle, drive the turn signal drive unit from a pre-set blinking start distance before the intersection,
   wherein the controller comprises a blinking cycle adjuster configured to cause the turn signal drive unit to drive with drive signals indicating blinking cycles different from each other, the blinking cycles include a first blinking cycle and a second blinking cycle shorter than the first blinking cycle, and
   the blinking cycle adjuster is configured to set the first blinking cycle for the vehicle that travels at a first position, and set the second blinking cycle for the vehicle that travels at a second position closer to the intersection than the first position;
   wherein the blinking cycle adjuster is configured to, when the environment information obtainer detects a crossing vehicle on a second cross street that intersects the current traveling street and that is closer to the vehicle than the first cross street, set a third blinking cycle among the blinking cycles for one or more of the turn signal lamps that indicate a turning direction of the vehicle to blink the one or more of the turn signal lamps with the third blinking cycle until the vehicle passes through the second cross street, and
   the third blinking cycle is longer than the first blinking cycle;
   wherein: the controller further comprises a deceleration limit controller, and
   the deceleration limit controller limits, when the environment information obtainer detects the crossing vehicle on the second cross street, deceleration speed of the vehicle until the vehicle passes through the second cross street.

2. A drive assist apparatus for the vehicle, the drive assist apparatus comprising:
   a turn signal drive unit configured to blink turn signal lamps provided on the vehicle at certain cycles;
   an environment information obtainer configured to obtain surrounding environment information on the vehicle; and
   a controller configured to, when a target traveling route of the vehicle is set to a route at least from a current traveling street in which the vehicle travels into a first cross street that intersects the current traveling street at an intersection ahead of the vehicle, drive the turn signal drive unit from a pre-set blinking start distance before the intersection,
   wherein the controller comprises a blinking cycle adjuster configured to cause the turn signal drive unit to drive with drive signals indicating blinking cycles different from each other, the blinking cycles include a first blinking cycle and a second blinking cycle shorter than the first blinking cycle, and
   the blinking cycle adjuster is configured to set the first blinking cycle for the vehicle that travels at a first position, and set the second blinking cycle for the vehicle that travels at a second position closer to the intersection than the first position;
   wherein the blinking cycle adjuster is configured to, when the environment information obtainer detects a following vehicle that follows the vehicle and detects a crossing vehicle on a second cross street that intersects the current traveling street and that is closer to the vehicle than the first cross street, set the first blinking cycle and the second blinking cycle for a rear turn signal lamp of the turn signal lamps that indicates a turning direction of the vehicle to blink the rear turn signal lamp with the first blinking cycle and the second blinking cycle, and set a third blinking cycle among the blinking cycles for a front turn signal lamp of the turn signal lamps that indicates the turning direction to blink the front turn signal lamp with the third blinking cycle until the vehicle passes through the second cross street, and
   the third blinking cycle is longer than the first blinking cycle;
   wherein: the controller further comprises a deceleration limit controller, and the deceleration limit controller limits, when the environment information obtainer detects a crossing vehicle on the second cross street before the first cross street, deceleration speed of the vehicle until the vehicle passes through the second cross street.

* * * * *